United States Patent [19]

James et al.

[11] 4,381,165
[45] Apr. 26, 1983

[54] CLUTCH FOR BELT DRIVE WITH MEANS FOR LIMITING START-UP TORQUE

[75] Inventors: Mark C. James; Ronald G. Borushaski, both of Independence, Mo.

[73] Assignee: Allis-Chalmers Corporation, Milwaukee, Wis.

[21] Appl. No.: 212,020

[22] Filed: Dec. 1, 1980

[51] Int. Cl.³ ............................................. F16H 7/12
[52] U.S. Cl. ...................................... 414/526; 192/11; 192/109 D; 198/616; 474/135
[58] Field of Search ................ 198/558, 616; 474/110, 474/133–138; 192/10, 11, 109 D, 109 F; 414/304, 326, 526

[56] References Cited

U.S. PATENT DOCUMENTS

| 1,347,017 | 7/1920 | Davies | 192/109 D |
| 3,483,688 | 12/1969 | Hollyday | 474/63 |
| 4,058,957 | 11/1977 | Roseberry | 192/11 |

Primary Examiner—Lawrence J. Staab
Attorney, Agent, or Firm—Charles L. Schwab

[57] ABSTRACT

The bin unloader belt drive for a combine includes a clutching idler mechanism in which the start-up torque delivered by the belt (11) from a drive pulley (12) to a driven pulley (13) is limited by using a dampener (51) which retards the spring biased movement of a clutching idler pulley (21) from its drive disestablishing position to its drive establishing position.

2 Claims, 5 Drawing Figures

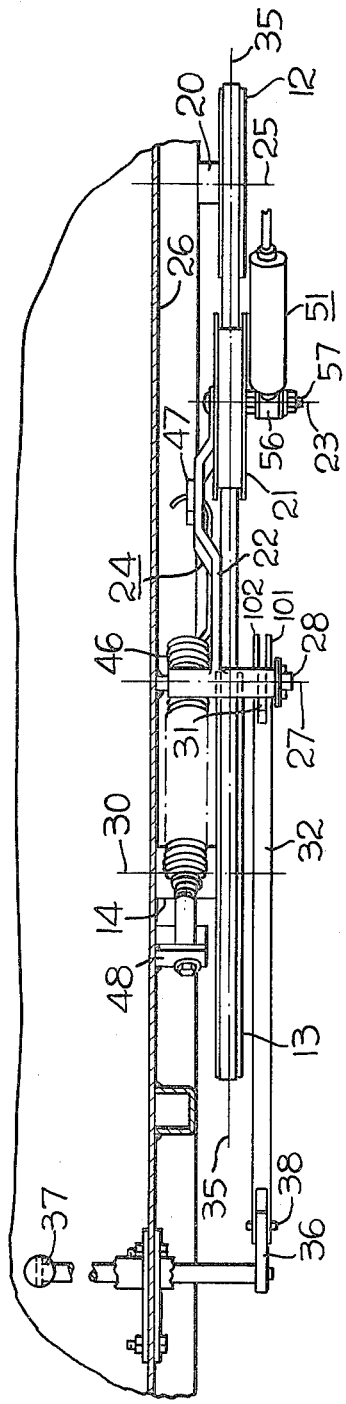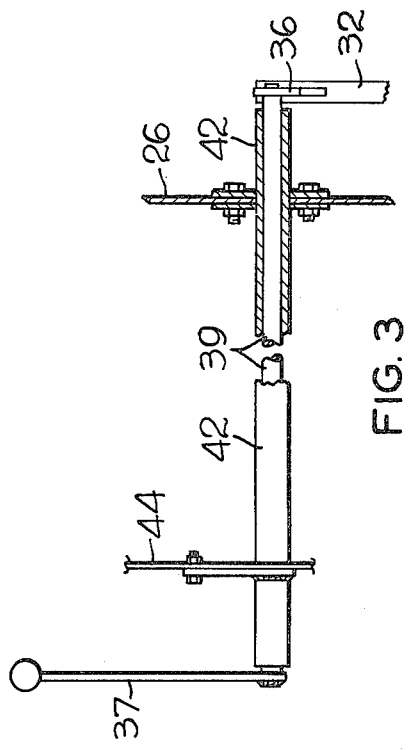

CLUTCH FOR BELT DRIVE WITH MEANS FOR LIMITING START-UP TORQUE

FIELD OF THE INVENTION

This invention relates to a clutching mechanism for a belt drive, and more particularly, to a means for modulating or limiting start-up torque.

BACKGROUND OF THE INVENTION

Heretofore others have used a shiftable clutching idler pulley belt drive, such as shown in U.S. Pat. No. 4,058,957, for establishing and disestablishing drive (transmission of power) between a drive pulley and a driven pulley. In using this type drive for the unloading auger of a combine, excessive start-up torque may be experienced resulting to either unsatisfactory life of components in the unloading drive train and unloading mechanism or the need to provide heavier duty components than would otherwise be required. The present invention proposes use of a dampener to slow the tensioning engagement of the clutching belt idler thereby limiting start-up torque. Others have heretofore suggested the use of a dampener in connection with a non-clutching belt idler, such as shown in U.S. Pat. No. 3,483,688.

BRIEF DESCRIPTION OF THE INVENTION

A clutching mechanism for a belt drive having drive and driven pulleys about which a belt is reeved, includes an idler support mounted on a support structure for movement toward and away from the plane defined by the parallel axes of the drive and driven pulleys between drive establishing and drive disestablishing positions. A clutching idler pulley is rotatably mounted on the idler support and operatively engages the belt at a location between the drive and driven pulleys. Spring means are operatively interposed between the support structure and the idler support urging the latter toward its drive establishing position and a control means is connected to the idler support permitting the latter to be selectively shifted from its drive establishing position to its drive disestablishing position. The control means may include a lost motion connection. A dampener is interconnected between the idler support and the support structure, which is operative to retard movement of the idler support from its drive disestablishing position to its drive establishing position, whereby the start-up torque delivered to the driven pulley is effectively limited.

BRIEF DESCRIPTION OF THE DRAWINGS

Two embodiments of the present invention are shown in the drawings, in which:

FIG. 2 is a top view of the belt drive shown in FIG. 1 with parts broken away for illustration purposes;

FIG. 3 is a view taken along the line III—III in FIG. 1;

DETAILED DESCRIPTION OF THE DRAWINGS

Figure 1:
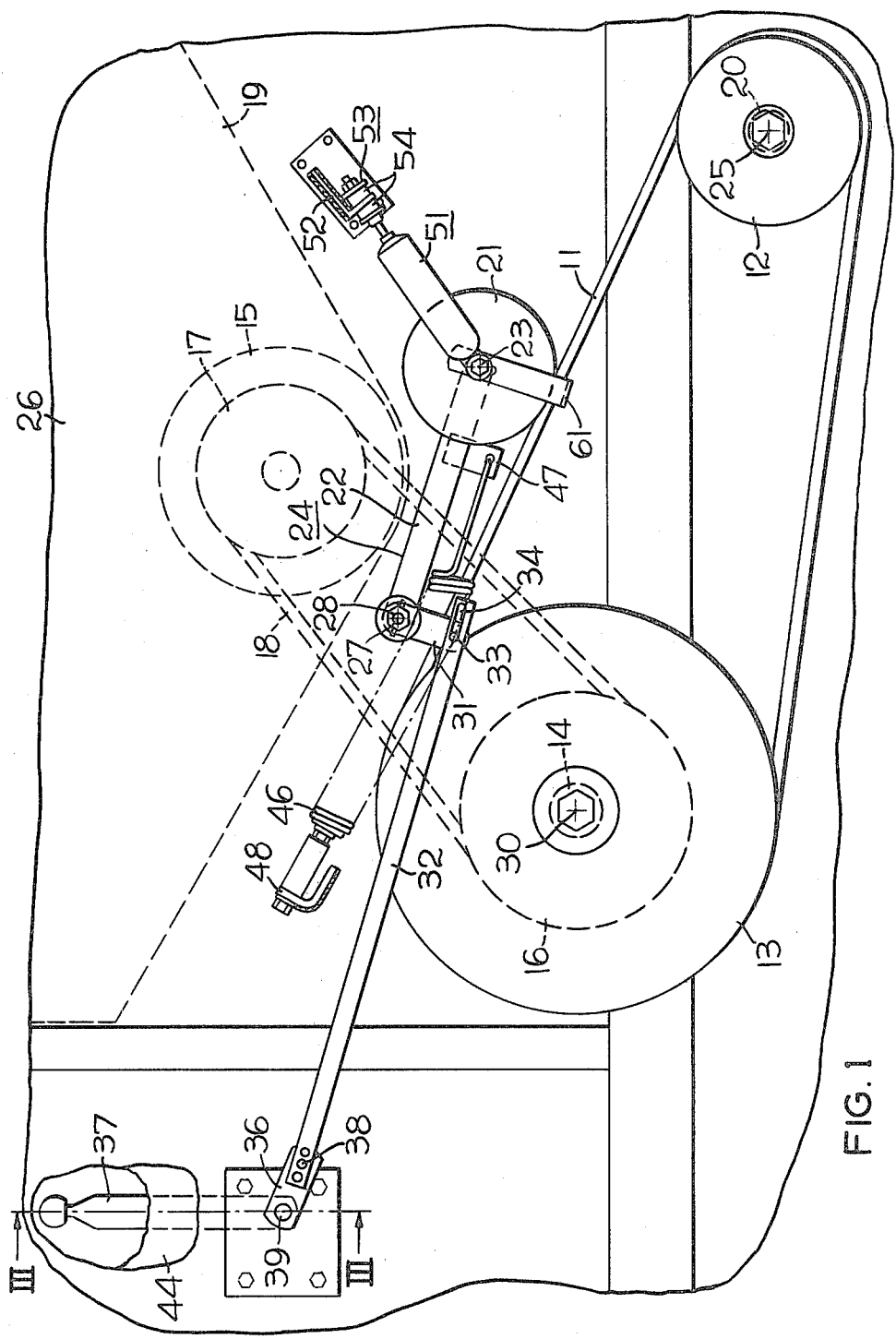
FIG. 1 is a side view of a belt drive with a manually operated idler pulley clutch used in connection with an unloading auger of a combine.

Referring to FIG. 1, a V-belt 11 is reeved about a drive pulley 12 and a driven pulley 13 at one side 26 of a combine. The driven pulley 13 is connected to a shaft 14 which in turn is connected to a bin unloading auger 15 through a pulley 16 on the opposite end of shaft 14, a pulley 17 on the far end of the auger 15 and a belt 18. The auger 15 is part of the unloading mechanism by which the grain in the storage bin 19 carried by the combine is unloaded. The pulley 12 and the drive shaft 20 on which it is mounted are disposed on an axis 25 which is in horizontally spaced parallel relation to the axis 30 of shaft 14. The pulleys 12 and 13 lie in a common vertical plane 35, as shown in FIG. 2.

Drive is established between the drive pulley 12 and driven pulley 13 by an idler clutch pulley 21 rotatably mounted on an arm 22 on a horizontal pivot axis 23 parallel to axes 25, 30. The arm 22 is a part of an idler support which includes a belt crank 24 pivotally connected to the frame or sidewall 26 of the combine on a horizontal pivot axis 27, parallel with axes 23, 25, 30, by a pin 28 welded to the sidewall 26. The belt crank 24 includes a downwardly extending arm 31 which is connected to an operating link 32 by a thrust transmitting portion in the form of a pin 33 extending through juxtaposed, elongated slots 34 in a pair of spaced legs 101 or 102 on one end of the link 32. The other end of the link 32 is pivotally connected to an arm 36 on a shaft part 39 of a manually operated lever 37 by a pivot pin 38.

Referring also to FIG. 3, the operating lever 37 is welded to a shaft 39 which is journalled in a sleeve 42 secured to a cab wall 44 of the combine. The arm 36 is connected to the outer end of the shaft 39 for movement therewith. The manually operated lever 37 is positioned at the operator's station of the combine which is within an enclosed cab.

Figures 4, 5:
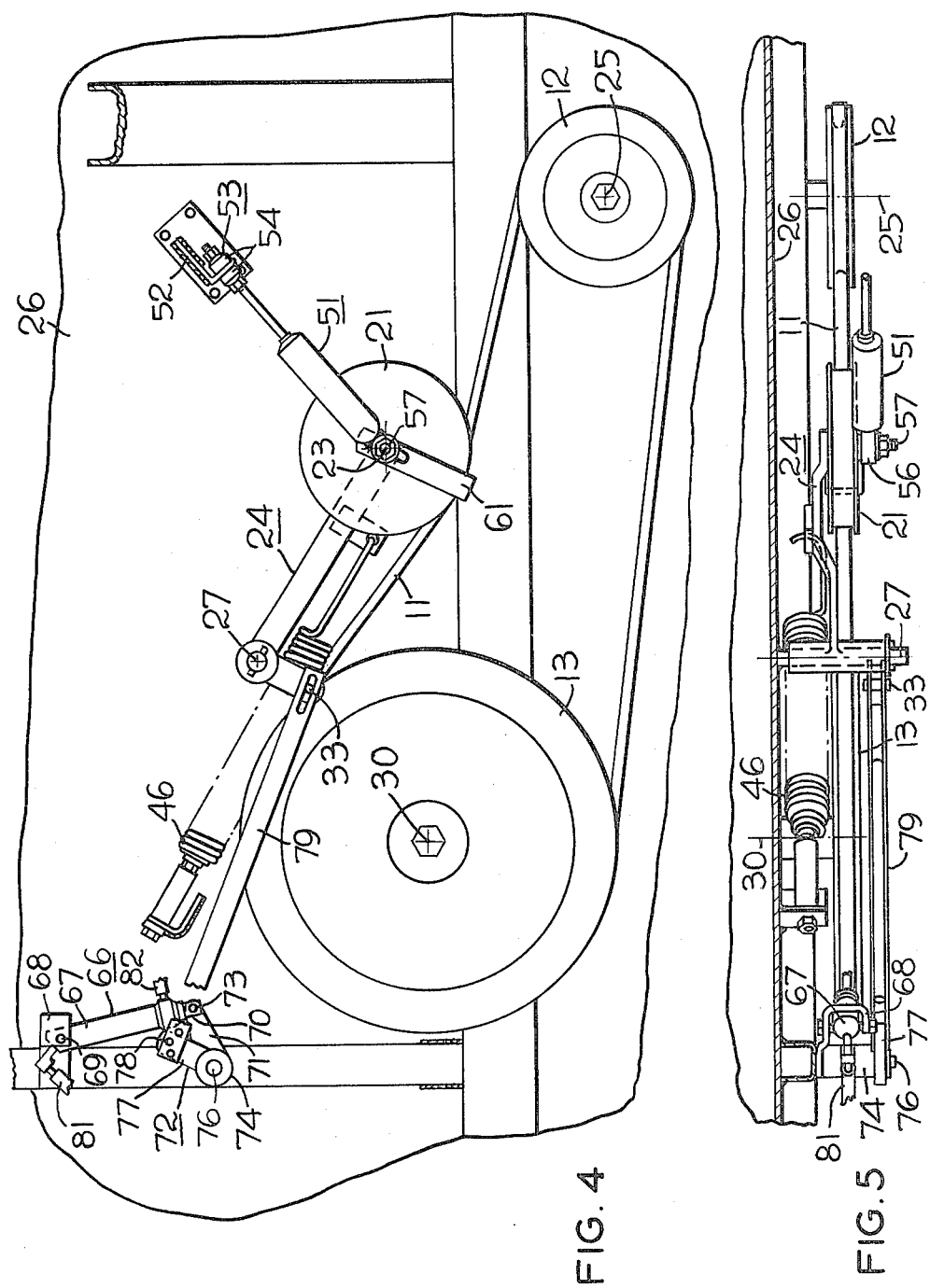
FIG. 4 is a side view of a belt drive with a power operated idler pulley clutch.
FIG. 5 is a top view of the belt drive shown in FIG. 4 with parts broken away for illustration purposes.

As shown in FIG. 2, a tension spring 46 for the clutch idler 21 has one end connected to a downwardly depending finger 47 secured by welding to the arm 22 of the bell crank 24 and its other end is connected to a bracket 48 welded to the sidewall 26. In the engaged position of the clutch idler 21, as shown in FIG. 4, the line of thrust of the tension spring 46 will be spaced a predetermined distance below the pivot axis 27 of the clutch idler bell crank 24. Thus, the spring 46 operates to hold the clutch idler against the belt 11 thereby tensioning it and causing drive torque to be transmitted from the drive pully 12 to the driven pulley 13. As shown in FIG. 1, the manual control has been moved to a clutch disengaging position wherein the belt is slack and the driven pulley 13 is not receiving sufficient driving torque to cause it to turn.

If the clutch idler pulley suddenly shifts to its drive establishing position, as shown in FIG. 4, the considerable inertia of the components of the driven grain unloading mechanism (which includes the unloading auger 15) results in excessive torque being transmitted to the unloading mechanism and its drive train components. The excessive start-up torque is effectively reduced by the use of a dampener or dash pot in the form of a shock absorber 51 connected to the idler pulley shaft 57. As illustrated, one end of the shock absorber is mounted on a bracket 52 secured on the sidewall 26 by yieldable mounting means 53 which includes a pair of resilient rubber-like cushions 54. The other end of the shock absorber 51 has an annular part 56 thereon through which the idler pulley shaft 57 extends. A suitable guide means 61 is secured to the pulley shaft 57 and serves to prevent the belt 11 from moving out of alignment with the clutch idler pulley 21.

Referring to FIGS. 4 and 5, power means in the form of a double-acting hydraulic jack 66 is provided for operating the clutch for the bin unloader belt drive. The hydraulic jack 66 has a cylinder 67 pivotally connected to a support 68 by a pin 69 and a piston rod 70 pivotally connected to an arm 71 of a bell crank 72 by a pin 73. The bell crank has a turbular part 74 mounted on a horizontally disposed pin 76 welded to a vertical channel of the wall 26 and a second arm 77 to which a clutch operating link 79 is pivotally connected by a pin 78. The jack 66 is adapted for connection to a conventional hydraulic supply and control system, not shown, through supply conduits 81,82 connected to parts in opposite ends of the jack cylinder 67.

OPERATION

As shown in FIG. 1, the control lever 37 is in its drive disestablishing position and the pin 33 abuts aligned wall at one set of corresponding ends of the slots 34. The clutch idler bell crank 24 has been pivoted counterclockwise from its drive establishing position to its drive disestablished position shown in FIG. 1. When it is desired to engage the unloading auger drive, the operator at the operator's station, where the lever 37 is located, will pivot the lever counterclockwise, as viewed in FIG. 1, to allow the tension spring 46 to move the clutch idler pulley 21 from its drive disestablishing position shown in FIG. 1 to its drive establishing position shown in FIG. 4. The movement of the idler pulley, and its support in the form of bell crank 24, to its drive establishing position, is retarded by the dampener 51 so the belt 11 will slip on the drive pulley 12 as the inertia of the grain unloading mechanism and its drive train are overcome. This limits the amount of torque transmitted by the belt 11 during commencement or start-up of the grain unloading operation. By limiting start-up torque, possible damage to the unloading mechanism and its drive train are avoided and the service life thereof is extended.

The power operated clutching device shown in FIGS. 4 and 5 operates in the same manner as the manually controlled version shown in FIGS. 1, 2 and 3, except for the power operation of the clutch operating linkage. In either case, the lost motion connection between the clutch idler support 24 and the operating linkage permits the tension spring 46 and the dampener 51 to control the speed of clutching movement of the clutch idler pulley 21. In other words, the control linkage does not shift the clutch idler pulley to its drive establishing position. Instead the operating link 32 or 79 is shifted so as to allow the spring 46, as retarded by the dampener 51, to move the clutch idler pulley to its drive establishing position and to resiliently hold it there. The pin 33 will be at a position intermediate the ends of the slots 34 when the clutch idler 21 is in its drive establishing position.

The embodiments of the invention in which an exclusive property or privilege is claimed are defined as follows:

1. In a combine having a grain storage bin, the combination comprising:
    an unloading mechanism for unloading the grain from said bin including an auger,
    a belt drive for driving said auger including drive and driven pulleys rotatably mounted on said combine on spaced parallel axes and a belt reeved about said pulleys,
    an idler arm pivotally mounted on said combine for swinging movement toward and away from the plane defined by said parallel axes between drive establishing and drive disestablishing positions,
    a clutching idler pulley operatively engaging said belt at a location between said drive and driven pulleys,
    a shaft rotatably mounting said idler pulley on said idler arm,
    spring means operatively interposed between said combine and idler arm urging the latter toward its drive establishing position,
    control means connected to said idler arm selectively operable to shift said idler arm from its drive establishing position to its drive disestablishing position; and
    a linear acting dampener having one end connected to said combine and its other end connected to said shaft, said dampener being operative to retard movement of said idler arm from its drive disestablishing position to its drive establishing position whereby the start-up torque delivered to said driven pulley is effectively limited.

2. The clutching mechanism of claim 1 wherein said connection between said other end of said dampener and said idler arm includes yieldable mounting means resiliently connecting said other end of said dampener and said support structure.

* * * * *

UNITED STATES PATENT OFFICE
CERTIFICATE OF CORRECTION

Patent No. 4,381,165          Dated April 26, 1983

Inventor(s) Mark C. James and Ronald G. Borushaski

It is certified that error appears in the above-identified patent and that said Letters Patent are hereby corrected as shown below:

Column 4, in lines 46 and 48, "other" should read --- one ---;

in line 47, "idler arm" should read --- combine ---; and in line 49, "support structure" should read --- combine ---.

Signed and Sealed this

Twelfth Day of July 1983

[SEAL]

Attest:

Attesting Officer

GERALD J. MOSSINGHOFF

Commissioner of Patents and Trademarks